United States Patent [19]

Robbins et al.

[11] Patent Number: 5,325,717
[45] Date of Patent: Jul. 5, 1994

[54] ADJUSTABLE MEASURING DEVICE

[75] Inventors: Rodney W. Robbins, Florence; E. Stanley Robbins, Killen; Frans M. Weterrings, Tuscumbia; Charles R. Hebner; John E. Watkins, both of Florence, all of Ala.

[73] Assignee: Robbins Industries, Inc., Florence, Ala.

[21] Appl. No.: 985,186

[22] Filed: Nov. 30, 1992

[51] Int. Cl.⁵ .............................................. G01F 19/00
[52] U.S. Cl. ........................................ 73/429; 73/426
[58] Field of Search ................. 73/426, 427, 428, 429; 33/524; D10/46.2

[56] References Cited

U.S. PATENT DOCUMENTS

| | | | |
|---|---|---|---|
| D. 294,213 | 2/1988 | Chasen | D10/46.2 |
| D. 328,867 | 8/1992 | Watt . | |
| 1,324,264 | 12/1919 | Parent | 73/429 |
| 2,099,430 | 11/1937 | Quea | D10/46.2 |
| 2,165,642 | 7/1939 | Mayer . | |
| 2,389,530 | 11/1945 | Miner . | |
| 2,396,943 | 3/1946 | Frank . | |
| 2,496,268 | 2/1950 | Chester . | |
| 2,555,956 | 6/1951 | Chester . | |
| 2,569,703 | 10/1951 | Weiland . | |
| 2,626,526 | 1/1953 | Chester . | |
| 2,697,353 | 12/1954 | Setecka . | |
| 2,854,849 | 10/1958 | Setecka . | |
| 2,882,732 | 4/1959 | Cercone | 73/429 |
| 3,013,436 | 12/1961 | Dailey | 73/426 |
| 3,690,182 | 9/1972 | Rodriguez . | |
| 3,798,975 | 3/1974 | Horst . | |
| 5,182,948 | 2/1993 | Robbins | 73/429 |

FOREIGN PATENT DOCUMENTS

| | | | |
|---|---|---|---|
| 0062536 | 5/1891 | Fed. Rep. of Germany | 73/429 |
| 271677 | 2/1951 | Sweden | 73/429 |
| 649068 | 1/1951 | United Kingdom . | |

Primary Examiner—Thomas B. Will
Attorney, Agent, or Firm—Curtis Morris & Safford

[57] ABSTRACT

The measuring device has a bowl. The bowl's capacity is adjusted by a dam structure located within the bowl and attached to a cover structure slidably mounted on the bowl. The slidable cover extends beyond the bowl for use as a handle. The handle has a downwardly-directed extension which is used to support and stabilize the device when the device rests on a flat surface. The handle also has a rounded indentation at the junction between the extension and the handle, so as to reinforce the junction and provide for easily gripping the device. The sides of the bowl structure are flexible so that they can be squeezed together to release the cover so that the device can easily be disassembled and reassembled for cleaning. A detent structure is provided to locate the sliding dam at pre-marked measurement locations. The detent structure is centrally located to permit strengthening of the sliding attachment and reduce wear.

10 Claims, 4 Drawing Sheets

ADJUSTABLE MEASURING DEVICE

This invention relates to measuring containers. More particularly, the invention relates to adjustable measuring scoops, bowls, and cups for use in measuring varying quantities of powders, grains, liquids, and other pourable materials.

For a person working in the kitchen and preparing a recipe, it is often a trying experience to measure out the proper amount of flour, sugar, shortening, water, and other recipe ingredients which usually are required in relatively large quantities.

The appropriate size measuring container must first be located. This may involve searching through a collection of measuring bowls, cups, scoops, and spoons to find one that is almost right for the job. Alternatively, it may involve discovering that an appropriate container is not readily available. Assuming one is found, care and patience must then be used in adding and subtracting the ingredient to be measured until there is just the right amount. Both of these steps can be time-consuming, exasperating, and cumbersome. Moreover, in the case where the ingredient is stored in a large, heavy sack, it can even be awkward and dangerous to lift the sack in order to pour out the ingredient. The situation can be made even more precarious if the container being filled is prone to tipping over and spilling.

Accordingly, it is an object of the present invention to provide an adjustable measuring container which is particularly suited to solving the foregoing problems.

In particular, it is an object of the present invention to provide an adjustable measuring container such as a scoop or spoon which can accommodate relatively large quantities of ingredients. It is desired to provide such a container which can be adjusted easily to a relatively large number of settings so that the precise amount needed can be measured with ease.

Another object is to provide such a measuring container which is relatively easy to grasp and hold.

It is a further object of the present invention to provide such a container which is relatively easy to fill, both when pouring the ingredient to be measured into the container and when using the container as a scoop.

It is a still further object of the present invention to provide such a container which is easy to take apart to facilitate cleaning, but which will not come apart in normal use.

Additionally, it is an object of the present invention to provide such a container which, in view of the capacity it is required to measure, is compact, light-weight, not unwieldy, and relatively easy to store in an appropriate kitchen location.

It also is an object of the invention to provide such a container which is relatively simple to construct and inexpensive to manufacture, rugged, and durable.

In accordance with the present invention, the foregoing objects are satisfied by the provision of an adjustable measuring device which has a body member forming a bowl. A slider member with a dam structure is slidably attached to the body member. The dam structure is shaped to fit the contours of the inside of the bowl to form a barrier which can be moved to change the effective volume of the bowl.

Preferably, the slider member extends beyond the bowl to serve as a handle and has a transverse extension adjacent one end. The length of the device can be reduced by moving the slider so that the device is more compact for storage. The extension extends to a location near the plane of the bottom of the bowl so that it keeps the bowl from tilting and spilling its contents when it is resting on a horizontal surface.

It also is preferable that the bottom of the bowl have a flattened portion, and that the handle extension is squared-off at one end so as to keep the bowl from tilting sideways while resting on a horizontal surface.

Preferably, the body member and the slider have a tongue-and-groove structure to slidably attach them together. The slider preferably is made to be relatively inflexible so that it will not come off of the body member when stress is put on the slider due to its use as a handle.

The sides of the body member forming the bowl are relatively flexible so that they can be squeezed towards one another by the user's hand to disengage the slider from the bowl so that it can be easily removed for cleaning. It also is preferable that the groove portion of the tongue-and-groove structure not be longer than the length of the flexible portions of the sides of the bowl. This further facilitates removal of the slider. The tongue-and-groove structure is shaped so as to urge the flexible sides together when the slider is pressed onto the body member, thus permitting the slider to be easily replaced.

The slider and its extension have a rounded indentation in the area of the junction between them. The indentation gives structural strength and integrity to the handle. Additionally, the handle extension and the indentation give the user a good grip when pushing or pulling the slider, and in using the container as a scoop.

A detent structure is provided to mark various positions of the slider corresponding to pre-determined measurements, such as one-half cup, one quarter cup, etc. The detent is formed by a projection which bears against the underside of the bowl cover formed by the slider, in a location spaced from the sides of the slider, where the cover has sufficient flexibility to bend and prevent undue frictional resistance which otherwise might make the cover hard to move.

The foregoing and other objects and advantages will be set forth in or apparent from the following description and drawings.

Figure 1:
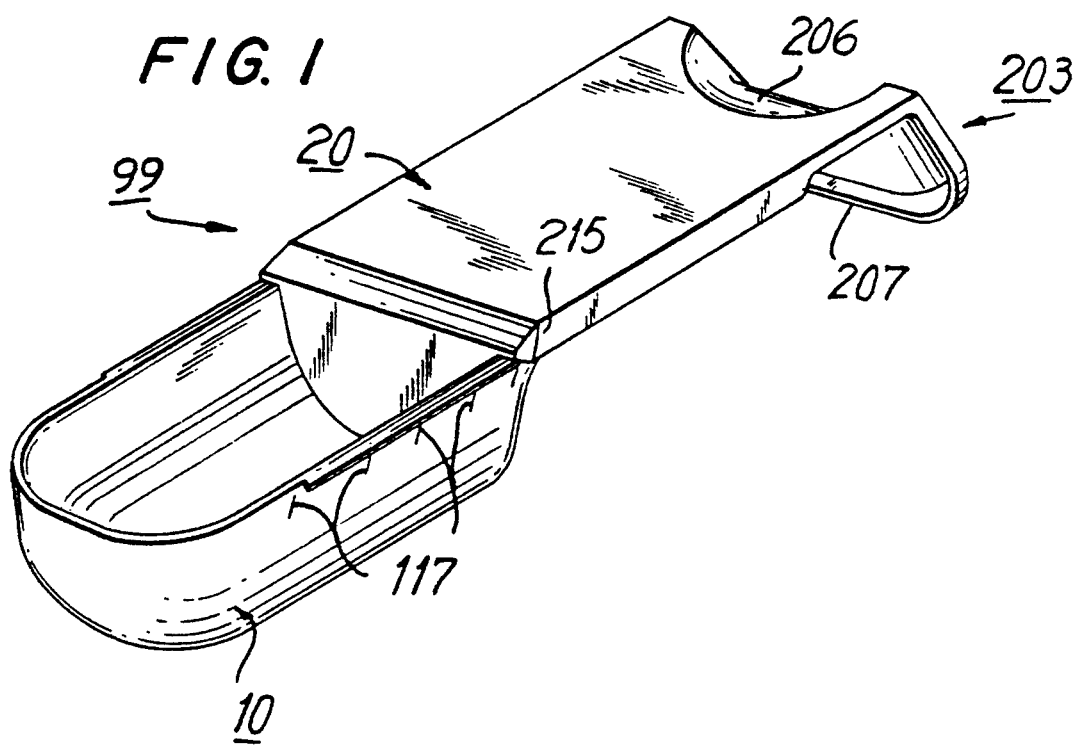
FIG. 1 is a perspective view of an adjustable measuring container constructed in accordance with the present invention, showing the slider member in a fully extended position.
Figure 2:
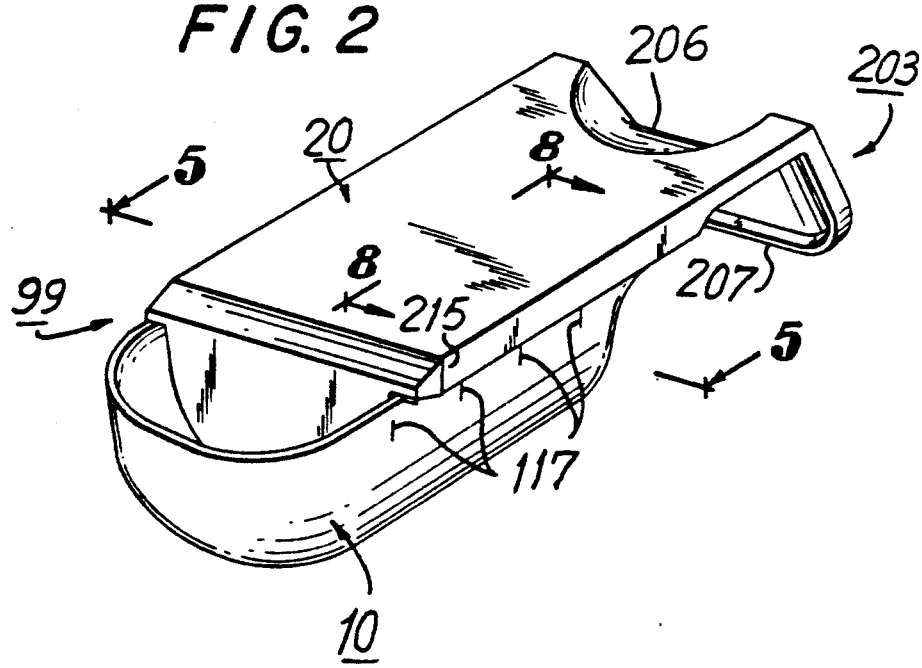
FIG. 2 is a perspective view of the container shown in FIG. 1 with the slider in a fully contracted position.

FIGS. 1 and 2 show an adjustable measuring device 99 constructed in accordance with the present invention. It comprises a body member 10 forming a bowl, and a slider member 20. Slider member 20 is slidably secured to the body member 10 so that one may slide it to any of a plurality of positions. The members may be constructed of plastic through well-known injection-molding techniques.

Figure 3A:
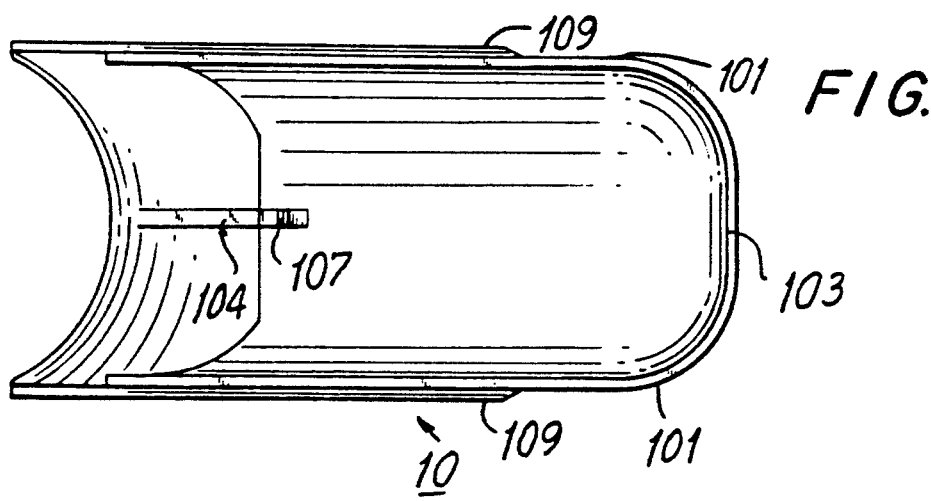
FIGS. 3a and 3b are top plan views of the body member and slider, respectively, of the container shown in FIGS. 1 and 2.
Figure 4A:
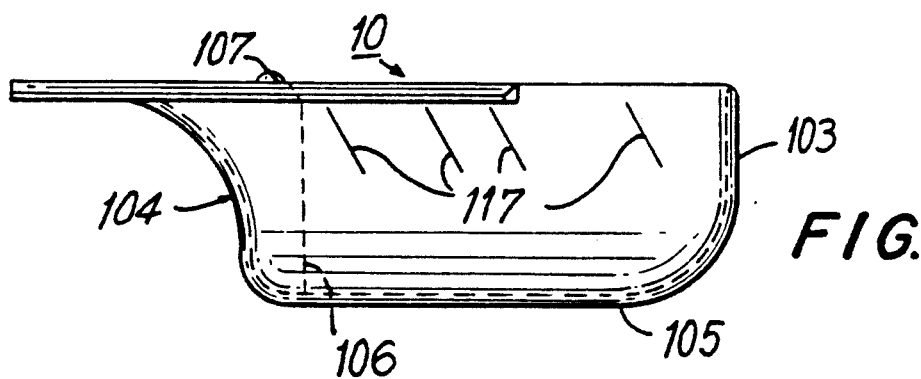
FIGS. 4a and 4b are side elevational views of the body member and slider, respectively, of the device shown in FIGS. 1 and 2.
Figure 5:
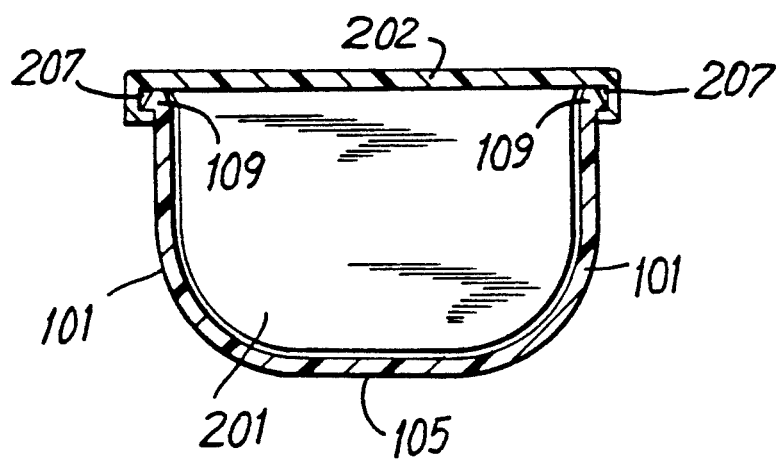
FIG. 5 is a cross-sectional view taken along line 5—5 of FIG. 2.

The body member 10, as shown in FIGS. 3a and 4a, has side walls 101, a curved front wall 103, a curved rear wall 104, and a bottom wall 105. These walls form a bowl. The side walls are relatively flexible over a substantial length. The top is open and unobstructed. As it is shown in FIG. 4a, the lower portion of the front wall 103 is curved with a relatively large radius of curvature. FIG. 5 shows that bottom wall 105 is substantially flat so as to reduce the tendency of the device to tip sideways when resting on a flat surface.

Referring again to FIGS. 3a and 4a, within the bowl 10 is a dam stop 106. The dam stop extends longitudinally forwardly from the rear wall 104 and upwardly from the bottom wall 105 to the top plane of the bowl. A slight projection or bump 107 (also see FIG. 8) is located on the uppermost edge of the stop 106, near the forward edge of the stop.

Figure 3B:
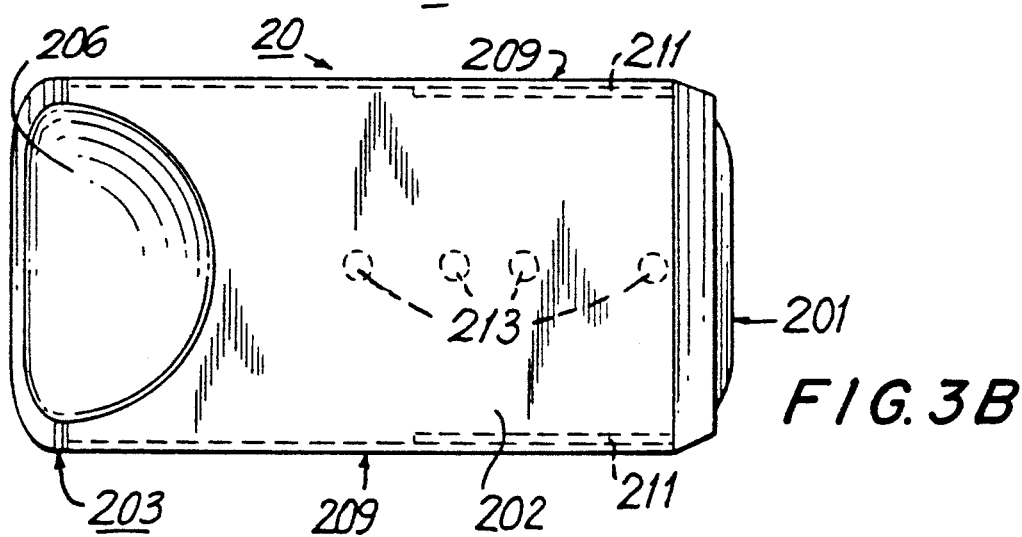
Figure 4B:
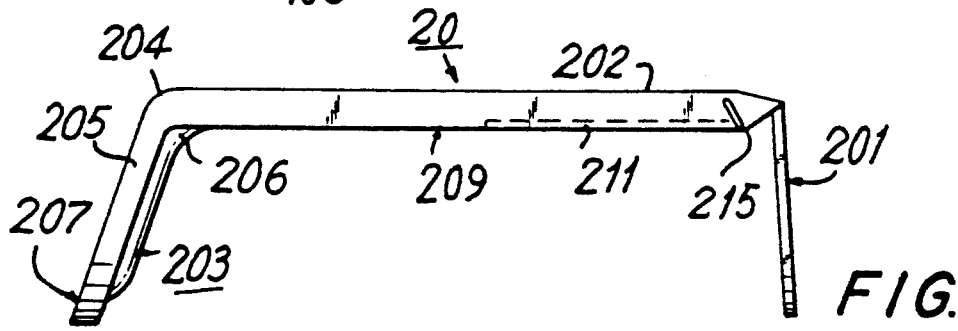

Referring now to FIGS. 3b and 4b, the slider member 20 has a cover structure 202 with a dam member 201 extending downwardly at one end; and a handle structure 203 at the other end. The cover structure is relatively thick and inflexible. The handle structure 203 has an extension 205 which extends downwardly at an angle and forms a bend 204 with the cover structure. The lower edge 207 of the extension 205 is substantially in the plane of bottom 105 of the bowl when the slider member is mounted thereon.

The handle structure 203 can be used to hold the device 99 when using it as a scoop or when adjusting the slider's position. The handle structure also is squared off; that is, the edge 207 has a straight portion (see FIGS. 1 and 2). The handle thus supports one end of the measuring device when it is resting on a level surface and gives it resistance to tipping forwardly, backwardly or sideways. Additionally, when the handle is fully retracted, as shown in FIG. 2, the device is more compact and requires less storage space than it would if the handle were immobile.

The handle structure 203 also contains a rounded indentation 206 in the region of the bend 204. The rounded indentation acts to reinforce the handle structure and greatly reduces flexing when the handle is pulled or pushed during adjustment of the measuring device. This reduces fatigue on the handle material and enhances the durability of the device.

The indentation 106 also provides a recess for the thumb of the user (see FIG. 7), and makes the device easier to grip securely and hold. It also gives the device a unique, attractive appearance.

When the slider member 20 is mounted on the body member 10, as shown in FIGS. 1 and 2, the slider's dam structure 201 extends into the bowl. The dam structure is shaped to fit the contours of side walls 101 and bottom 105, thus forming a movable barrier to define the effective volume of the front portion of the bowl, and hold both liquids and solids in that portion of the bowl.

When the slider member 20 is mounted on the body member 10, the cover structure 202 extends rearwardly and covers the part of the bowl member that is not intended to be used. In this way, the rear portion of the bowl is sealed to prevent the unwanted accumulation of material in that location irrespective of the slider's position.

As FIG. 1 shows, when the slider is fully extended, the volume of the bowl is at a maximum. Correspondingly, FIG. 2 shows that the volume is at a minimum when the slider member is fully contracted.

Figure 6:
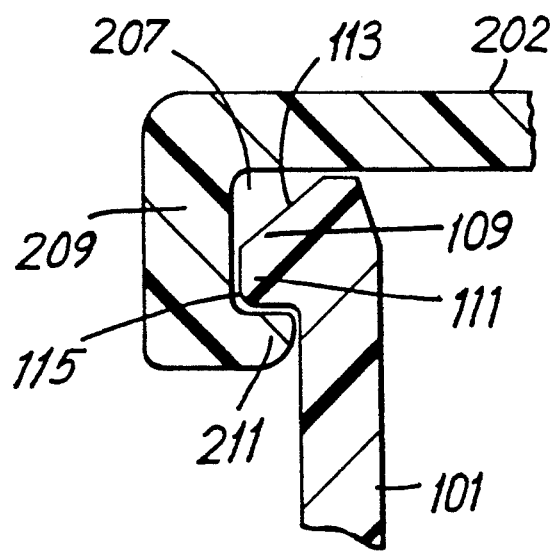
FIG. 6 is an enlarged broken-away portion of the upper left corner of the cross-section shown in FIG. 5.

As FIG. 5 shows, slider member 20 is mounted and held onto the body 10 by the use of a tongue-and-groove structure including two tongues 109 and two grooves 207. FIG. 6, which is an enlargement of the upper left-hand corner portion of FIG. 5, indicates the manner in which the tongues and the grooves mate with one another. The interconnection between the slider and the body member must be strong enough to hold the parts together when the bowl is full and the device is lifted by the handle, or when the bowl is scooped into a quantity of flour, sugar or other such material. The forces exerted on the tongue and groove then can be considerable.

The grooves 207 consist of flanges 209 extending downwardly from the side edges of the cover structure, and smaller flanges 211 extending inwardly from the flanges 209. The plastic material of the cover and flanges is relatively thick and inflexible to give the joint sufficient strength to resist the forces tending to separate the cover from the body when the device is in use.

Grooves 207 are located as far forward as possible on cover structure 202, and extend rearward a length less than or equal to the length of the flexible portions of side walls 101. This facilitates disassembly.

The tongues 109 comprise flanges 111 formed at the upper edges of the side walls 101.

Flanges 111 are shaped so as to facilitate the replacement of the slider on the body 10 after it has been removed for cleaning. Thus, as FIG. 6 shows, the upper portions of flanges 111 are beveled at 113. Additionally, the lower edges of the flanges 111 are rounded 115 to facilitate removal of the slider.

The slider is removed in the following manner: Slider member 20 is placed at or near the fully-contracted position shown in FIG. 2. Pressure is exerted inwardly on the upper portions of the flexible side walls 101 with the fingers; that is, the user squeezes the side walls toward one another. Because the length of the tongue-and-groove structure is less than or equal to the length of the side wall's flexible portions, the pressure exerted moves tongues 109 inwardly and substantially clear from grooves 207. A slight upward pressure on the slider member then causes the smaller flanges 211 to slip over rounded portions 115 of tongues 109 and separate the slider from the bowl member.

Figure 7:
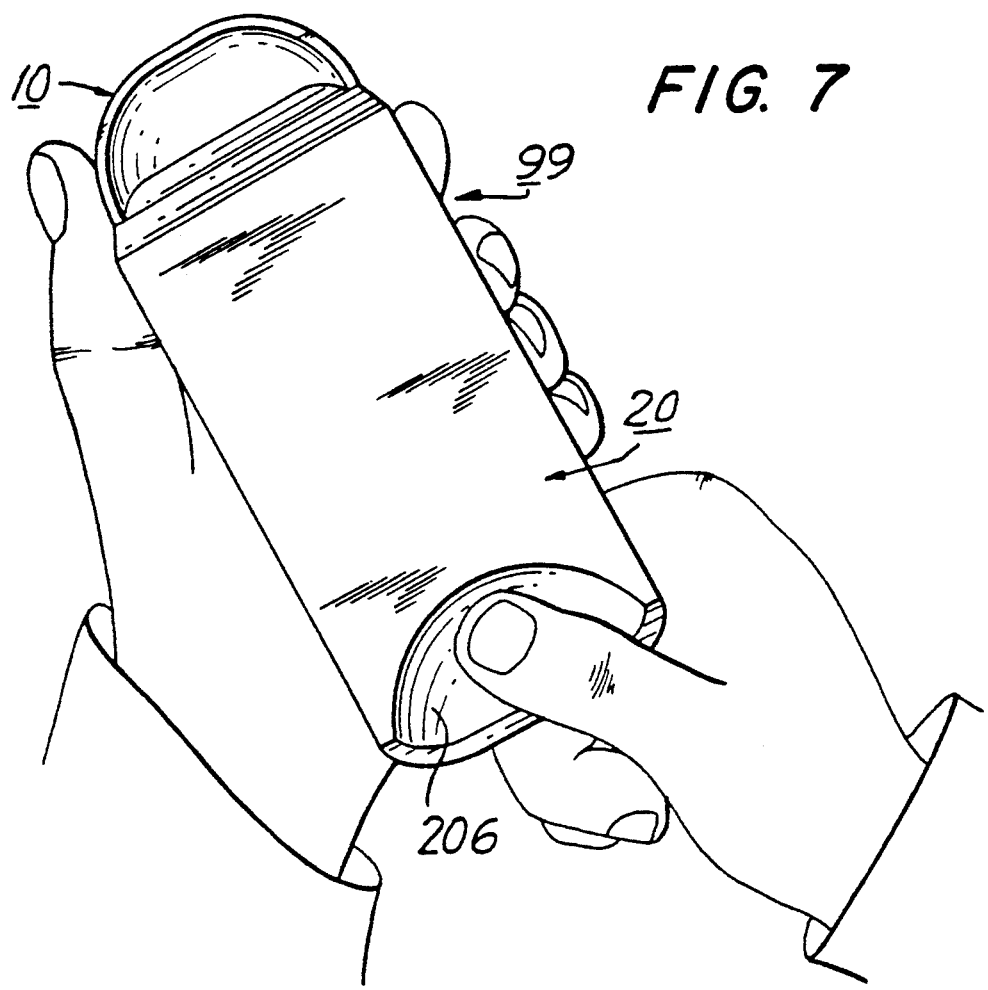
FIG. 7 is a perspective view of the container of FIG. 1 in the hands of a user.

FIG. 7 illustrates one way the slider can be removed. Here, the inward pressure on side walls 101 comes from the palm and fingers of the left hand, while the right hand exerts the upward pressure on handle structure 203. Of course, other methods also are feasible.

To reattach the slider to the body member, the slider member is replaced on top of the body member with dam structure 201 in the bowl's interior and substantially in the fully forward position. The user merely presses down to slip flanges 211 over beveled edges 113 of the tongues 109, and snap the tongues and grooves together. Inward pressure may be applied to the side walls 101 to facilitate the process.

Figure 8:
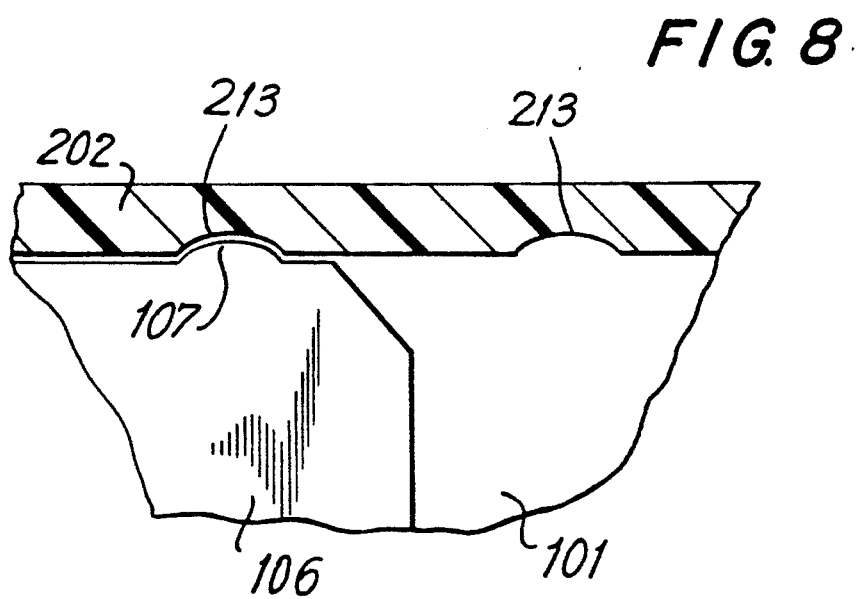
FIG. 8 is a broken-away cross-sectional view taken along line 8—8 of FIG. 2.

Referring now to FIGS. 3b and 8, a detent mechanism is provided to set the dam at predetermined location. The detent mechanism comprises the bump 107 on the stop 106 and dimples 213 (FIG. 3b) on the under surface of the slider cover structure 202. The location of each dimple is such that the detent stops the slider at a location giving the bowl one of a series of predetermined volumes, such as ⅛ cup, ¼ cup, etc., as the markings 117 on the side of the device shown in FIG. 4a indicate.

A mark 215 on the forward portion of the slider is aligned with one of the markings 117 when the bump is engaged in one of the dimples, thus indicating the volume the container is set to measure.

The detent mechanism is located approximately on the longitudinal center line of the slider. This is done because that location is where the relatively stiff slider is the most flexible. This minimizes the force applied to the bump 107 as it slides over the undersurface of the slider so as to make the slider relatively easy to move, and reduces wear on the bump and the slider. This enhances the durability of the device.

The detent mechanism's bump is located as far forward as possible. This is done because the forward location of the grooves on the cover structure allows for some vertical flexing farther rearward in the relatively stiff slider cover. Consequently, when the slider is moved to its forward most position, the dimple will not solidly click and lock in with the bump unless it is located in the aforementioned forward position.

The adjustable measuring container described above and shown in the drawings is highly advantageous and meets the objectives set forth above.

Because of the strong tongue-and-groove structure, the slider can be used as a handle without coming off, and yet is relatively easy to move to adjust the volume of measurement. The handle can be retracted to reduce the space required for storage of the device in a drawer.

The unique handle structure of the slider facilitates the use of the container as a scoop for scooping out ingredients out of larger containers. Moreover, the handle structure acts to support and stabilize the container when it is resting on a level surface, especially while it is being filled. Further, because of the rounded indentation in the handle structure, the structure itself is especially strong and resistant to breakage, and is easy to grasp and hold securely.

The device can be disassembled and assembled relatively simply through the application of modest amounts of finger pressure. Because of this, the device is easy to clean.

Also, the apparatus can easily be constructed through well-known plastic injection molding techniques.

The device is constructed so as to be resistant to wear and free from malfunction.

This invention can be practiced in many different forms other than the specific forms described above. Those specific forms are described in order to set forth the best mode presently contemplated for carrying out the invention. However, the protection of this patent should not be limited to those forms and should be interpreted to cover other measuring containers utilizing the spirit and inventive contribution of this invention.

What I claim is:

1. An adjustable measuring device comprising, in combination, a body member having a bowl, said bowl having a forward end wall, a rear end wall, opposing side walls and a bottom wall, a slider member slidably secured to said body member and having a dam element extending into said bowl, said dam element being shaped to fit the internal contours of said bowl so as to form a movable barrier to change the effective volume of said bowl, said slider member extending outwardly from said body to serve as a handle and having an extension adjacent one end, said extension extending in a direction transverse to said slider member to a location substantially in the plane of said bottom wall of said bowl, said body member further having tongues at said side walls' upper edges, and said slider member further having grooves at its side edges, said grooves positively engaging with said tongues so as to securely slidably attach said slider member to said body member, in which a portion of at least one of said side walls of said body member is relatively flexible, whereby said slider member can be disassembled from said body member by exerting inward pressure on said side walls.

2. A device as in claim 1 in which said grooves of said slider member extend longitudinally away from said dam structure by a distance less than the length of said relatively flexible portion of said side wall.

3. A device as in claim 2 in which said tongues extend outwardly from said side walls, said tongues having bevels at their upper outside edges and rounded lower outside edges.

4. An adjustable measuring device comprising, in combination, a body member having a bowl, said bowl having a forward end wall, a rear end wall, opposing side walls and a bottom wall, a slider member slidably secured to said body member and having a dam element extending into said bowl, said dam element being shaped to fit the internal contours of said bowl so as to form a movable barrier to change the effective volume of said bowl, said slider being slidably attached at its sides to said body member and forming a relatively broad and inflexible cover over at least a portion of said bowl, and a detent structure, said detent structure comprising a projection on said body member and a series of depressions in said slider's cover into which said projection fits when it is aligned with one of said depressions, said projection causing said cover to flex when said cover travels over said projection, said detent structure being located at a position spaced inwardly from said sides of said slider substantially on the longitudinally center line of said cover.

5. A device as in claim 4 in which said slider extends outwardly beyond said body member for use as a handle.

6. An adjustable measuring device comprising, in combination, a body member having a bowl, said bowl having a forward end wall, a rear end wall, opposing side walls and a bottom wall, a slider member slidably secured to said body member and having a dam element extending into said bowl, said element being shaped to fit the internal contours of said bowl so as to form a movable barrier to change the effective volume of said bowl, said slider being slidably attached at its sides to said body member and forming a relatively broad and inflexible cover over at least a portion of said bowl, and a detent structure, said detent structure comprising a projection on said body member and a series of depressions in said slider's cover into which said projection fits when it is aligned with one of said depression, said projection causing said cover to flex when said cover travels over said projection, said detent structure being located at a position spaced inwardly from said sides of said slider towards the longitudinal center line of said cover, in which said body includes a stop member inside said bowl longitudinally extending from said rear end wall and extending upwardly from said bottom wall substantially to the top of said bowl, said projection extending upwardly from the top of said stop member, said depressions being aligned longitudinally on the underside of said cover structure so as to positively releasably engage with said projection when said slider member is moved relative to said body member.

7. A device as in claim 6 in which said projection is located substantially toward said forward end wall of said bowl.

8. An adjustable measuring device comprising, in combination, a body member having a bowl, said bowl having a forward end wall, a rear end wall, opposing side walls and a bottom wall, a slider member slidably secured to said body member and having a dam element extending into said bowl, said dam element being shaped to fit the internal contours of said bowl so as to form a movable barrier to change the effective volume of said bowl, tongue-and-groove means for slidably securing said slider to said body member, said slider member extending outwardly from said body to serve as a handle, said slider member being relatively inflexible and said side walls of said body member being relatively flexible so as to permit said side walls to be squeezed together to disengage said tongue from said groove to remove said slider from said body member.

9. A device as in claim 8 in which said tongue-and-groove means comprises a tongue at the upper edge of each of said side walls, and a groove formed at each edge of said slider, each of said tongues having an outwardly beveled upper edge to urge said side walls inwardly when said slider is pressed downwardly against said upper edges to facilitate replacement of said slider on said body member.

10. A device as in claim 9 in which said groove has a C-shaped cross-section and said tongue has a flat lower portion to engage the lower portion of said C-shaped cross-section.

* * * * *

UNITED STATES PATENT AND TRADEMARK OFFICE
CERTIFICATE OF CORRECTION

PATENT NO. : 5,325,717
DATED : July 5, 1994
INVENTOR(S) : Rodney W. Robbins, et al.

It is certified that error appears in the above-identified patent and that said Letters Patent is hereby corrected as shown below:

Column 6, claim 4, line 40, change "longitudinally" to --longitudinal--

Column 6, claim 6, line 59, change "depression" to --depressions--.

Signed and Sealed this

Twenty-seventh Day of September, 1994

Attest:

BRUCE LEHMAN

Attesting Officer    Commissioner of Patents and Trademarks